United States Patent
Wu (10) Patent No.: US 11,297,663 B2
(45) Date of Patent: Apr. 5, 2022

(54) DEVICE AND METHOD OF HANDLING A RADIO NETWORK TEMPORARY IDENTIFIER

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 295 days.

(21) Appl. No.: 16/406,030

(22) Filed: May 8, 2019

(65) Prior Publication Data

US 2019/0350019 A1 Nov. 14, 2019

Related U.S. Application Data

(60) Provisional application No. 62/668,801, filed on May 8, 2018.

(51) Int. Cl.
*H04W 76/11* (2018.01)
*H04W 74/08* (2009.01)
*H04W 88/08* (2009.01)

(52) U.S. Cl.
CPC ........ *H04W 76/11* (2018.02); *H04W 74/0833* (2013.01); *H04W 88/085* (2013.01)

(58) Field of Classification Search
CPC .......................... H04W 74/0833; H04W 76/27
See application file for complete search history.

(56) References Cited

U.S. PATENT DOCUMENTS

| | | | |
|---|---|---|---|
| 2018/0213579 A1* | 7/2018 | Hong | H04W 76/10 |
| 2018/0227843 A1* | 8/2018 | Wu | H04M 15/57 |
| 2018/0332516 A1* | 11/2018 | Oak | H04W 36/08 |
| 2019/0021130 A1* | 1/2019 | Kim | H04W 76/20 |
| 2019/0215887 A1* | 7/2019 | Burbidge | H04W 76/11 |

OTHER PUBLICATIONS

3GPP TSG-RAN3#99bis R3-181832 Sanya, China, Apr. 16, 2018, Apr. 2018 (Year: 2018).*
3GPP TSG-RAN3 Meeting #99b R3-181836 Sanya, China, Apr. 16-20, 2018, Apr. 2018 (Year: 2018).*

(Continued)

*Primary Examiner* — Romani Ohri
(74) *Attorney, Agent, or Firm* — Winston Hsu (57) ABSTRACT

A Distributed Unit (DU) transmitting a random access (RA) response including a cell Radio Network Temporary Identifier (RNTI) (C-RNTI) to the communication device, in response to a RA preamble from a communication device; receiving a radio resource control (RRC) message from the communication device; transmitting an INITIAL uplink (UL) RRC MESSAGE TRANSFER message including the RRC message to a Centralized Unit (CU), wherein the ITIAL UL RRC MESSAGE TRANSFER message includes the C-RNTI; receiving a UE CONTEXT SETUP REQUEST message from the CU; transmitting a UE CONTEXT SETUP RESPONSE message to the CU; receiving a downlink (DL) RRC MESSAGE TRANSFER message from the CU, wherein the DL RRC MESSAGE TRANSFER message includes a RRC response message; transmitting the RRC response message to the communication device according to the C-RNTI; communicating data with the communication device according to the C-RNTI.

10 Claims, 5 Drawing Sheets

(56) References Cited

OTHER PUBLICATIONS

3GPP TS 38.331 V15.1.0 (Mar. 2018).
3GPP TS 38.473 V15.1.0, Mar. 2018.
3GPP TS 38.470 V15.1.0, Mar. 2018.
3GPP TSG-RAN WG2 Meeting #101 bis R2-1806455 Sanya, China, Apr. 16-20, 2018.
3GPP TSG-RAN WG2 Meeting #101bis R2-1804849 Sanya, China, Apr. 16-20, 2018.
3GPP TSG-RAN3#99bis R3-181832 Sanya, China, Apr. 16, 2018, Apr. 2018.
3GPP TS 38.300 V15.1.0 (Mar. 2018).
3GPP TS 36.331 V15.1.0 (Mar. 2018).
3GPP TSG-RAN3 Meeting #99b R3-181836 Sanya, China, Apr. 16-20, 2018, Apr. 2018.

\* cited by examiner

DEVICE AND METHOD OF HANDLING A RADIO NETWORK TEMPORARY IDENTIFIER

CROSS REFERENCE TO RELATED APPLICATIONS

This application claims the benefit of U.S. Provisional Application No. 62/668,801, filed on May 8, 2018, which is incorporated herein by reference.

BACKGROUND OF THE INVENTION

1. Field of the Invention

The present invention relates to a communication device and a method used in a wireless communication system, and more particularly, to a communication device and a method of handling a Radio Network Temporary Identifier.

2. Description of the Prior Art

A user equipment (UE) in a radio resource control (RRC) CONNECTED state (RRC_CONNECTED) is configured with a Radio Network Temporary Identifier (RNTI) by a base station (BS), and communicates with the BS according to the RNTI. The UE and the BS keep the RNTI when the UE enters a RRC INACTIVE state (RRC_INACTIVE) from the RRC_CONNECTED. Later, the UE in the RRC_INACTIVE initiates a RRC Resume procedure with the BS. However, the BS fails to communicate with the UE due to using a wrong RNTI during or after the RRC Resume procedure.

SUMMARY OF THE INVENTION

The present invention therefore provides a method and related communication device for handling a Radio Network Temporary Identifier (RNTI) to solve the abovementioned problem.

A method for a Distributed Unit (DU) is disclosed to handle a RNTI. The method comprises: receiving a random access (RA) preamble from a communication device; transmitting a RA response (RAR) comprising a cell RNTI (C-RNTI) to the communication device, in response to the RA preamble; receiving a radio resource control (RRC) message from the communication device; transmitting an INITIAL uplink (UL) RRC MESSAGE TRANSFER message including the RRC message to a Centralized Unit (CU), wherein the INITIAL UL RRC MESSAGE TRANSFER message includes the C-RNTI; receiving a UE CONTEXT SETUP REQUEST message for responding to the INITIAL UL RRC MESSAGE TRANSFER message for the communication device from the CU; transmitting a UE CONTEXT SETUP RESPONSE message for responding to the UE CONTEXT SETUP REQUEST message, to the CU; receiving a downlink (DL) RRC MESSAGE TRANSFER message from the CU, wherein the DL RRC MESSAGE TRANSFER message includes a RRC response message for responding to the RRC message; transmitting the RRC response message to the communication device according to the C-RNTI; and communicating data with the communication device according to the C-RNTI.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
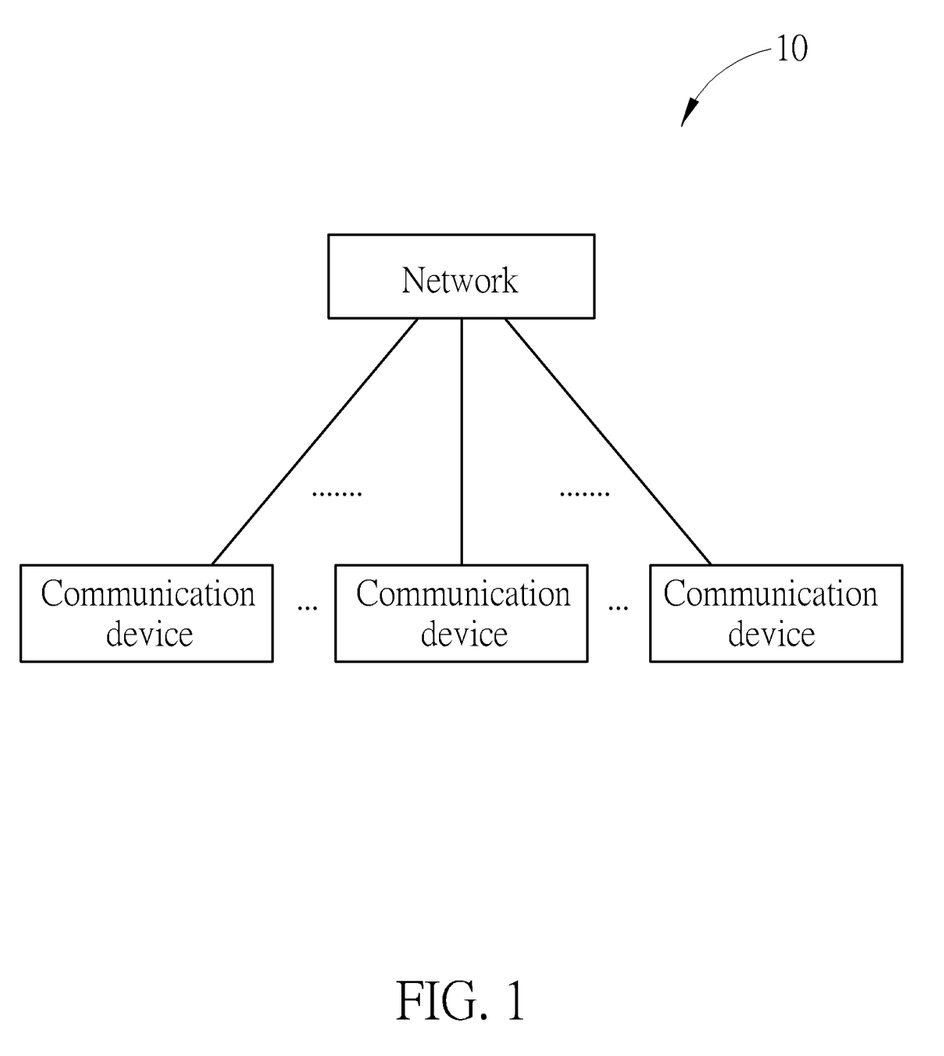
FIG. 1 is a schematic diagram of a wireless communication system according to an example of the present invention.

In FIG. 1, the wireless communication system 10 is briefly composed of a network and a plurality of communication devices. The network and the communication devices communicate with each other via at least one carrier. The network and the communication device communicate with each other via one or multiple cells (e.g., multiple carriers) belonging to one or multiple base stations (BSs).

In some implementations, the network includes a Fifth Generation (5G) (or called New Radio (NR)) Radio Access Network (RAN) and a 5G Core (5GC). The 5G RAN includes at least one 5G BS (or called gNB). The 5G BS includes at least one Centralized Unit (CU) (or called gNB-CU) and at least one Distributed Unit (DU) (or called gNB-DU). The DU(s) connects to the CU(s), e.g., via an interface (e.g., F1 interface). The communication devices may communicate (e.g., transmit or receive) with the CU(s) via the DU(s).

A communication device may be a user equipment (UE), a mobile phone, a laptop, a tablet computer, an electronic book, a portable computer system, a vehicle, a ship or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
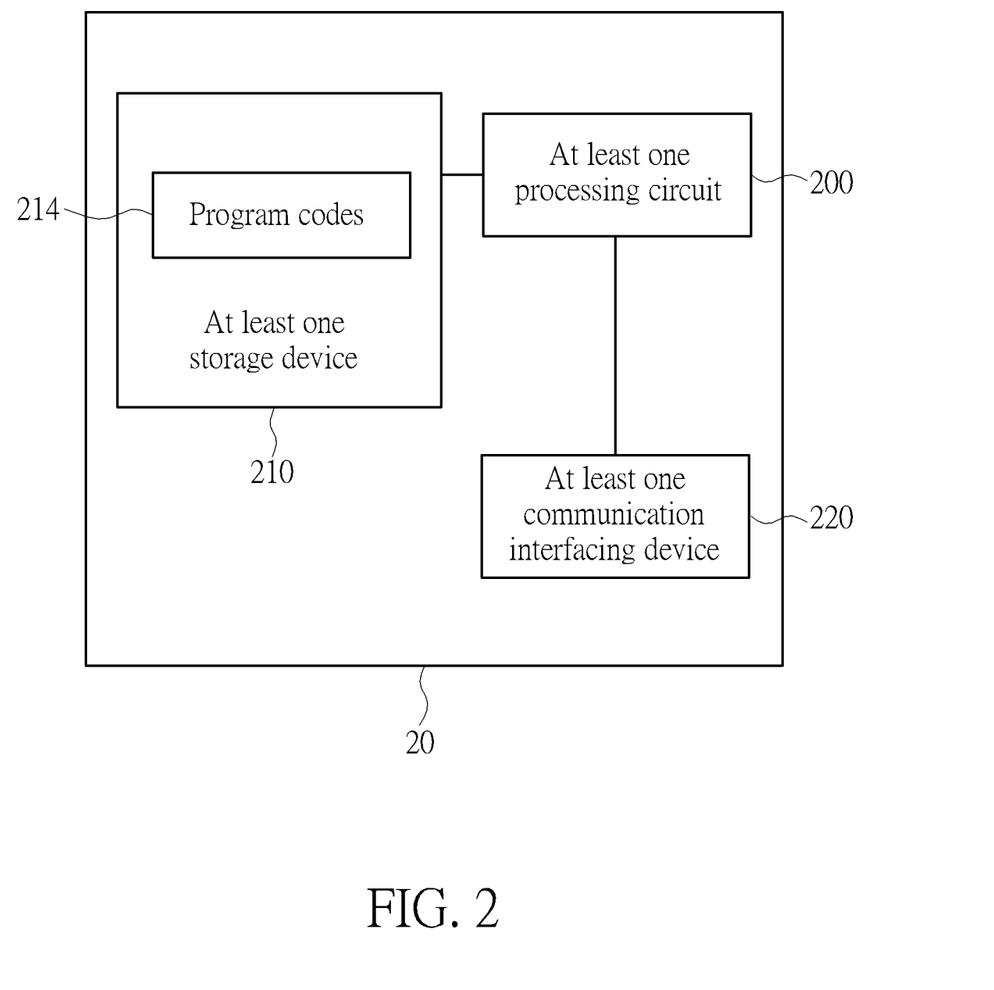
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

In the following examples, a UE is used for representing the communication device in FIG. 1, to simplify the illustration of the embodiments. A DU is in a BS (e.g., the 5G BS of the network in FIG. 1).

Figure 3:
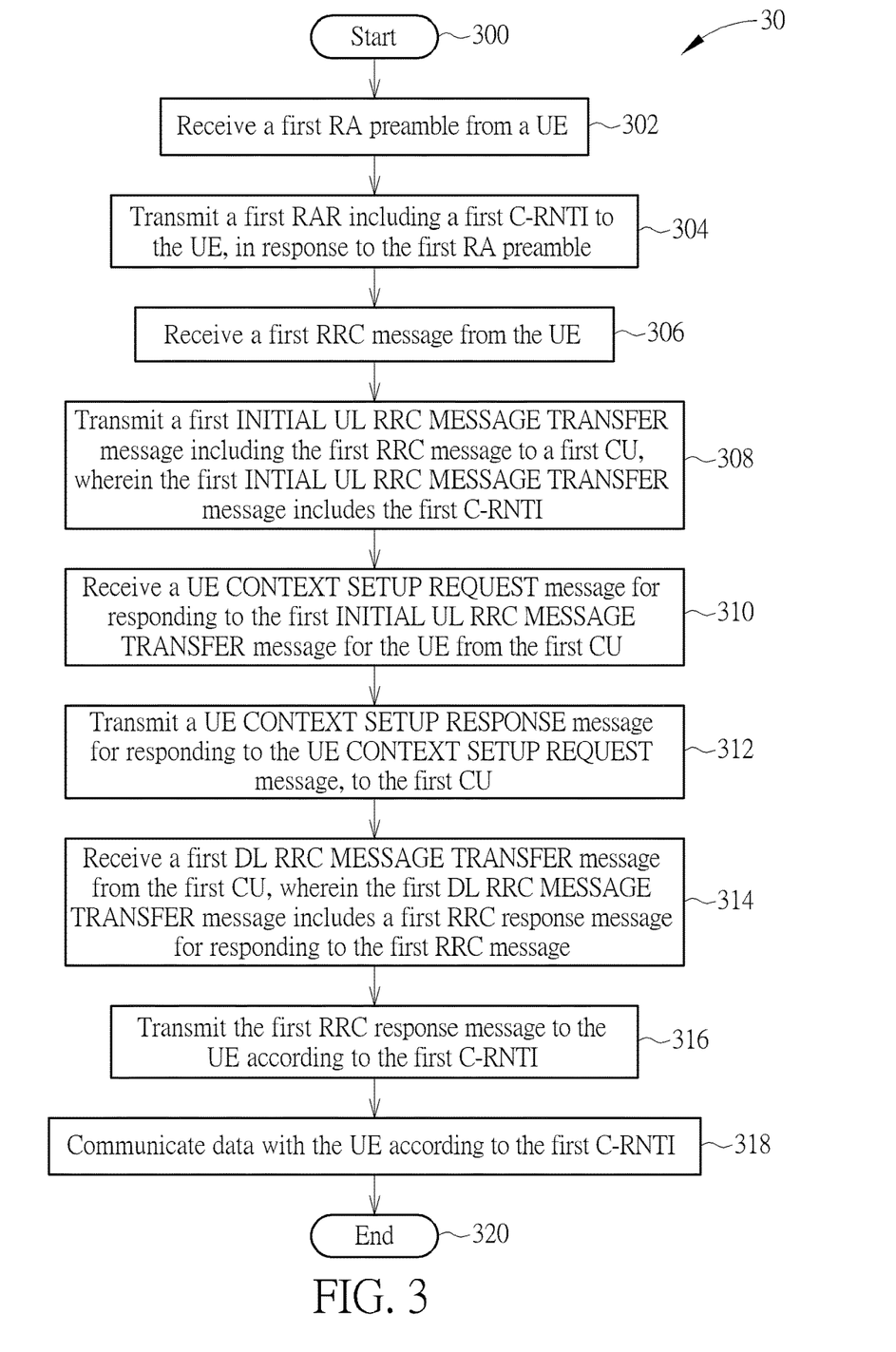
FIG. 3 is a flowchart of a process according to an example of the present invention.

A process 30 in FIG. 3 is utilized in a first DU and includes the following steps:

Step 300: Start.

Step 302: Receive a first random access (RA) preamble from a UE.

Step 304: Transmit a first RA response (RAR) including a first cell Radio Network Temporary Identifier (RNTI) (C-RNTI) to the UE, in response to the first RA preamble.

Step 306: Receive a first radio resource control (RRC) message from the UE.

Step 308: Transmit a first INITIAL uplink (UL) RRC MESSAGE TRANSFER message including the first RRC message to a first Centralized Unit (CU), wherein the first INITIAL UL RRC MESSAGE TRANSFER message includes the first C-RNTI.

Step 310: Receive a UE CONTEXT SETUP REQUEST message for responding to the first INITIAL UL RRC MESSAGE TRANSFER message for the UE from the first CU.

Step 312: Transmit a UE CONTEXT SETUP RESPONSE message for responding to the UE CONTEXT SETUP REQUEST message, to the first CU.

Step 314: Receive a first DL RRC MESSAGE TRANSFER message from the first CU, wherein the first DL RRC MESSAGE TRANSFER message includes a first RRC response message for responding to the first RRC message.

Step 316: Transmit the first RRC response message to the UE according to the first C-RNTI.

Step 318: Communicate (e.g., transmit or receive) data with (e.g., to or from) the UE according to the first C-RNTI.

Step 320: End.

According to the process 30, the first DU communicates with the UE according to the first C-RNTI included in the RAR.

In one example, the first DU communicates the data with the UE according to the first C-RNTI, after transmitting the first RRC response message to the UE. In one example, the UE communicates (e.g., transmit or receive) the data with (e.g., to or from) the first DU according to (e.g., by using) the first C-RNTI. In one example, the UE receives the first RRC response message according to (e.g., by using) the first C-RNTI.

In one example, the UE CONTEXT SETUP REQUEST message includes a second C-RNTI. In one example, a first value of the first C-RNTI and a second value of the second C-RNTI are the same or different. In one example, the UE receives the second C-RNTI before performing Step 302, and the UE discards (or ignores) the second C-RNTI, in response to the first RRC response message. In another example, the UE CONTEXT SETUP REQUEST message does not include a C-RNTI.

In some implementations, the UE CONTEXT SETUP RESPONSE message includes the first C-RNTI. In other implementations, the UE CONTEXT SETUP RESPONSE message does not include the first C-RNTI.

Figure 4:
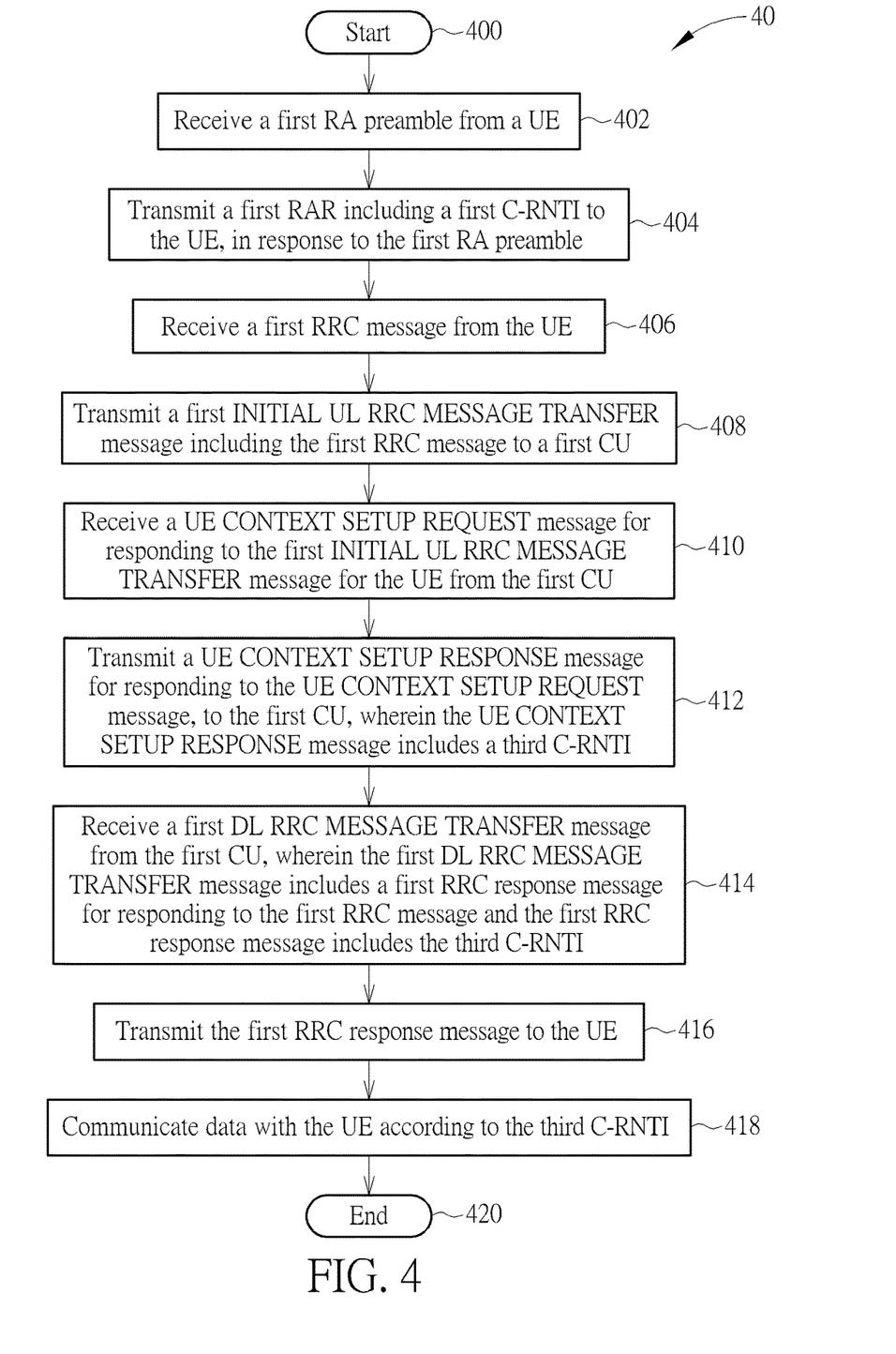
FIG. 4 is a flowchart of a process according to an example of the present invention.

A process 40 in FIG. 4 is utilized in a first DU and includes the following steps:

Step 400: Start.

Step 402: Receive a first RA preamble from a UE.

Step 404: Transmit a first RAR including a first C-RNTI to the UE, in response to the first RA preamble.

Step 406: Receive a first RRC message from the UE.

Step 408: Transmit a first INITIAL UL RRC MESSAGE TRANSFER message including the first RRC message to a first CU.

Step 410: Receive a UE CONTEXT SETUP REQUEST message for responding to the first INITIAL UL RRC MESSAGE TRANSFER message for the UE from the first CU.

Step 412: Transmit a UE CONTEXT SETUP RESPONSE message for responding to the UE CONTEXT SETUP REQUEST message, to the first CU, wherein the UE CONTEXT SETUP RESPONSE message includes a third C-RNTI.

Step 414: Receive a first DL RRC MESSAGE TRANSFER message from the first CU, wherein the first DL RRC MESSAGE TRANSFER message includes a first RRC response message for responding to the first RRC message and the first RRC response message includes the third C-RNTI.

Step 416: Transmit the first RRC response message to the UE.

Step 418: Communicate (e.g., transmit or receive) data with (e.g., to or from) the UE according to the third C-RNTI.

Step 420: End.

According to the process 40, the first DU communicates with the UE according to the third C-RNTI included in the UE CONTEXT SETUP RESPONSE message, i.e., the latest C-RNTI generated by the first DU.

In one example, the first DU communicates the data with the UE according to the third C-RNTI, after transmitting the first RRC response message to the UE. In one example, the UE discards (or ignores) the first C-RNTI, in response to the first RRC response message. In one example, a first value of the first C-RNTI and a third value of the third C-RNTI are the same or different.

In one example, the first CU includes a second C-RNTI in the UE CONTEXT SETUP REQUEST message. The UE receives the second C-RNTI before performing Step 402. The second value of the second C-RNTI and the third value of the third C-RNTI may be the same or different. The first CU discards (or ignores) the second C-RNTI, when receiving the third C-RNTI. The UE discards the second C-RNTI in response to receiving the third C-RNTI. In another example, the UE CONTEXT SETUP REQUEST message does not include a C-RNTI.

Figure 5:
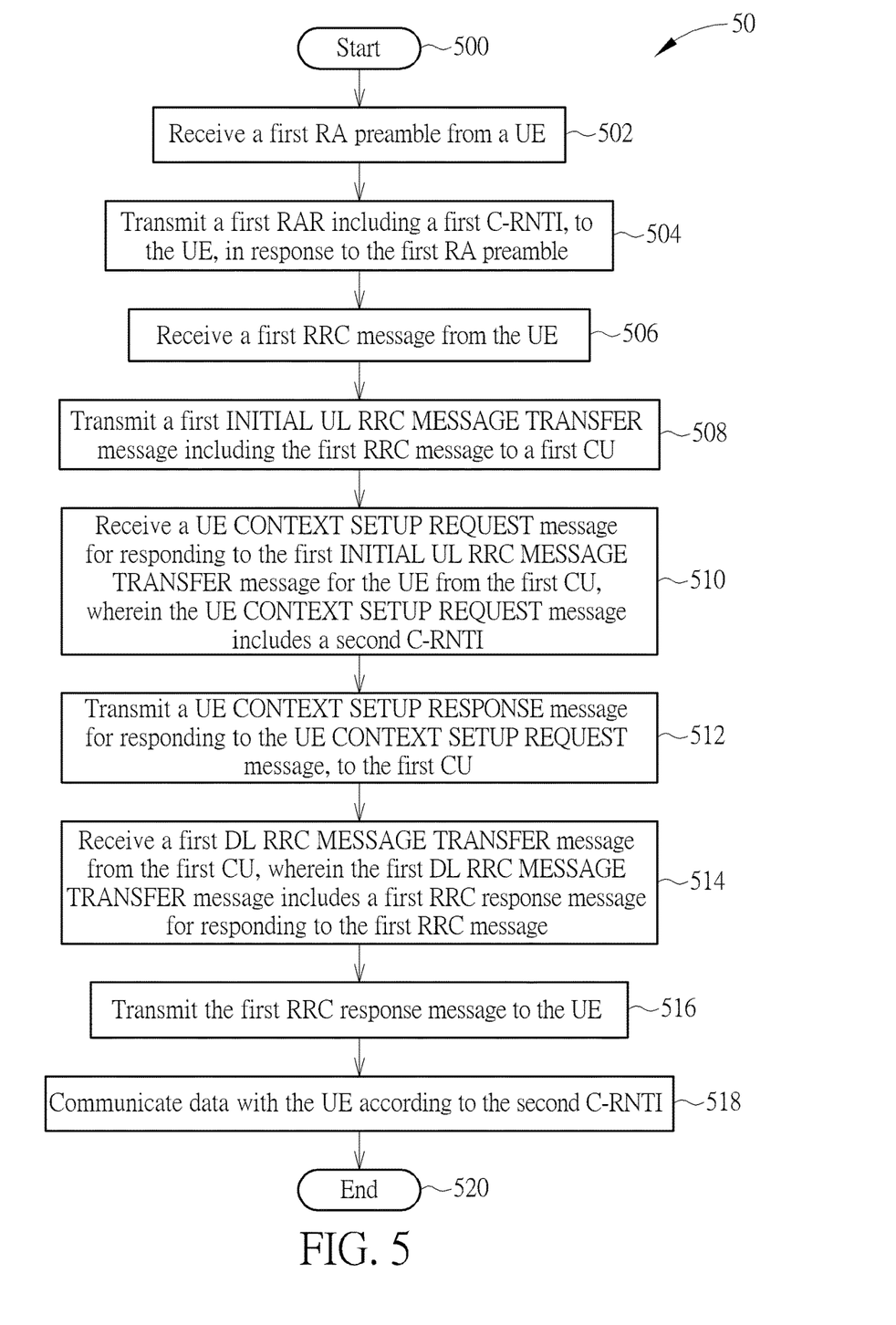
FIG. 5 is a flowchart of a process according to an example of the present invention.

A process 50 in FIG. 5 is utilized in a first DU and includes the following steps:

Step 500: Start.

Step 502: Receive a first RA preamble from a UE.

Step 504: Transmit a first RAR including a first C-RNTI, to the UE, in response to the first RA preamble.

Step 506: Receive a first RRC message from the UE.

Step 508: Transmit a first INITIAL UL RRC MESSAGE TRANSFER message including the first RRC message to a first CU.

Step 510: Receive a UE CONTEXT SETUP REQUEST message for responding to the first INITIAL UL RRC MESSAGE TRANSFER message for the UE from the first CU, wherein the UE CONTEXT SETUP REQUEST message includes a second C-RNTI.

Step 512: Transmit a UE CONTEXT SETUP RESPONSE message for responding to the UE CONTEXT SETUP REQUEST message, to the first CU.

Step 514: Receive a first DL RRC MESSAGE TRANSFER message from the first CU, wherein the first DL RRC MESSAGE TRANSFER message includes a first RRC response message for responding to the first RRC message.

Step 516: Transmit the first RRC response message to the UE.

Step 518: Communicate (e.g., transmit or receive) data with (e.g., to or from) the UE according to the second C-RNTI.

Step 520: End.

According to the process 50, the first DU communicates with the UE according to the second C-RNTI included in the UE CONTEXT SETUP REQUEST message. The second C-RNTI may be (e.g., have been) stored (keep or maintain) by the UE, when the UE enters an RRC INACTIVE state (RRC_INACTIVE) from a RRC CONNECTED state (RRC_CONNECTED). The UE receives the first C-RNTI in the RAR.

In one example, the first DU communicates the data with the UE according to the second C-RNTI, after transmitting the first RRC response message to the UE. In one example, a first value of the first C-RNTI and a second value of the second C-RNTI are the same or different. In one example, the UE discards (or ignores) the first C-RNTI in response to the first RRC response message.

The following examples may be applied to the above processes.

In one example, the first DU allocates the first C-RNTI in response to the first RA preamble and includes in the first RAR.

In one example, the first INITIAL UL RRC MESSAGE TRANSFER message includes the first C-RNTI. The first CU may discard (or ignore) the first C-RNTI for the processes 40 and 50. In another example, the first INITIAL UL RRC MESSAGE TRANSFER message does not include the first C-RNTI.

In one example, the first DU transmits the first RRC response message to the UE according to (e.g., by using) the first C-RNTI. For example, the first DU transmits a DL control information (DCI) with a cyclic redundancy check (CRC) scrambled by the first C-RNTI to the UE on a physical DL control channel (PDCCH). The DCI configures a DL assignment for a PDSCH transmission including the first RRC response message. The UE receives the DCI on the PDCCH according to (e.g., by using) the first C-RNTI. Then, the UE receives the PDSCH transmission according to (e.g., by using) the DCI. The DCI and the PDSCH transmission may or may not in the same time slot. The UE extracts the first RRC response message from the PDSCH transmission.

In one example, the first RRC message is a RRC Resume Request (RRCResumeRequest) message. In one example, the first RRC response message is a RRC Resume (RRCResume) message.

In one example, the first DU receives from the UE a first RRC complete message for responding to the first RRC response message. The first RRC complete message may be a RRC Resume Complete (RRCResumeComplete) message. In one example, the first DU transmits to the first CU an UL RRC MESSAGE TRANSFER message including the first RRC complete message.

In one example, the first CU receives the second C-RNTI from a second DU, before receiving the first RRC message. Then, the first CU determines to configure the UE to enter a RRC_INACTIVE before receiving the first RRC message. In one example, for the processes 30-50, the first CU stores (or keeps, maintains) the second C-RNTI in response to the determination. In another example, for the process 30, the first CU releases the second C-RNTI in response to the determination. In some implementations, the first CU transmits a first RRC Release (RRCRelease) message to the UE via the second DU, wherein the first RRCRelease message configures the UE to enter the RRC_INACTIVE, in response to the determination. The first CU transmits a UE CONTEXT RELEASE COMMAND message to the second DU, in response to the determination. The second DU releases the second C-RNTI and transmits a UE CONTEXT RELEASE COMPLETE message to the first CU, in response to the CONTEXT RELEASE COMMAND message.

In one example, the first CU receives the second C-RNTI from a second CU. For example, the first CU transmits a RETRIEVE UE CONTEXT REQUEST message to the second CU, in response to the first RRC message. The first CU receives a RETRIEVE UE CONTEXT RESPONSE message for responding to the RETRIEVE UE CONTEXT REQUEST message from the second CU. The RETRIEVE UE CONTEXT RESPONSE message includes the second C-RNTI.

In one example, the UE receives the second C-RNTI from the first CU or the second CU, before transmitting the first RRC message or before entering the RRC_INACTIVE. For example, the UE in a RRC_CONNECTED receives the second C-RNTI from the first CU or the second CU in at least one RRC Reconfiguration message from the first CU or the second CU, before transmitting the first RRC message or before entering the RRC_INACTIVE. For example, the UE in a RRC_IDLE or in the RRC_CONNECTED receives the second C-RNTI from the first DU or the second DU in a second RAR, before transmitting the first RRC message or before entering the RRC_INACTIVE. The first DU or the second DU may transmit the second RAR for responding to a second RA preamble from the UE.

In one example, the first DU and the second DU are the same DU or different DUs connecting to the same CU or different CUs.

In one example, the first DU transmits a DCI with a CRC scrambled by the second/third C-RNTI to the UE on a PDCCH. The UE receives the DCI according to (e.g., by using) the second C-RNTI, and transmits or receives the data according to (e.g., by using) the DCI.

In one example, the data includes a Transmission Power Control (TPC) command, a Channel State Information (CSI), a Channel Quality Indicator (CQI), a Sounding Reference Signal (RS), a DCI, a CSI-RS, a PDCCH order, a PDSCH transmission and/or a Physical UL Share Channel (PUSCH) transmission.

In one example, the UE receives the DCI on a PDCCH according to (e.g., by using) the first C-RNTI. The DCI configures a DL assignment for a PDSCH transmission. Then, the UE receives the PDSCH transmission according to (e.g., by using) the DCI. The DCI and the PDSCH transmission may or may not be in the same time slot. In another example, the UE receives a DCI on a PDCCH according to (e.g., by using) the first C-RNTI. The DCI configures an UL grant for a PUSCH transmission. The UE transmits the PUSCH transmission according to (e.g., by using) the DCI. The DCI and the PDSCH transmission may or may not be in the same time slot.

In one example, before transmitting the first RRC message, the UE enters the RRC_INACTIVE from the RRC_CONNECTED due to receiving the first RRCRelease message from the first CU or the second CU via a DU (e.g., the first DU, the second DU or another DU).

In one example, the UE enters the RRC_CONNECTED in response to the first RRC response message. The UE may stop a cell reselection function in response to the first RRC response message. The UE may transmit at least one CQI or at least one CSI to the first DU on a PUCCH in response to the first RRC response message or in response to entering the RRC_CONNECTED. The first DU may transmit at least one DCI scheduling PDSCH transmission, according to the at least one CQI or the at least one CSI.

Then, the first CU transmits a second RRCRelease message to the UE which is in the RRC_CONNECTED via the first DU, if the first CU detects that the UE is (e.g., has been) in inactivity for a while. The second RRCRelease message may configure the UE to enter the RRC_INACTIVE or the RRC_IDLE. In the case of the RRC_INACTIVE and the process 30, the UE stores (or keeps, maintains) the first C-RNTI in response to the second RRCRelease message. In the case of the RRC_INACTIVE and the process 50, the UE stores (or keeps, maintains) the second C-RNTI in response to the second RRCRelease message. In the case of the RRC_INACTIVE and the process 40, the UE the UE stores (or keeps, maintains) the third C-RNTI in response to the second RRCRelease message.

In one example, the first RRC message includes an Inactive RNTI (I-RNTI) or information (e.g., short message authentication code-integrity (MAC-I)) generated from the I-RNTI, and does not include any C-RNTI. The UE may generate the short MAC-I from the I-RNTI, a cell identity and/or a physical cell identity. In another example, the first RRC message includes the second C-RNTI or information (short MAC-I) generated from the second C-RNTI, and does not include the I-RNTI. The UE may generate the short MAC-I from the second C-RNTI, a cell identity and/or a physical cell identity. The UE may receive the I-RNTI in the first RRCRelease message or in a RRC Reconfiguration message from the first CU or the second CU via a DU (e.g., the first DU, the second DU or another DU).

In one example, the first DU receives a third RA preamble from a UE (e.g., the UE or another UE). The first DU transmits a third RAR including a fourth C-RNTI to the UE, in response to the third RA preamble. The first DU receives a second RRC message from the UE. The first DU transmits a second INITIAL UL RRC MESSAGE TRANSFER message including the second RRC message to the first CU. The second INITIAL UL RRC MESSAGE TRANSFER message includes the fourth C-RNTI. The first DU receives a second DL RRC MESSAGE TRANSFER message for responding to the second INITIAL UL RRC MESSAGE TRANSFER message for the UE from the first CU, wherein the second DL RRC MESSAGE TRANSFER message includes a second RRC response message for responding to the second RRC message. The first DU transmits the second RRC response message to the UE according to (e.g., by using) the fourth C-RNTI. In one example, neither the second DL RRC MESSAGE TRANSFER message nor the second RRC response message includes a C-RNTI. In one example, the second RRC response message includes the fourth C-RNTI. In the both above examples, the first DU communicates data with the UE according to (e.g., by using) the fourth C-RNTI. In one example, the first DU transmits a DCI with a CRC scrambled by the fourth C-RNTI to the UE on a PDCCH. The UE receives the DCI according to (e.g., by using) the fourth C-RNTI, and transmits or receive the data according to (e.g., by using) to the DCI. Examples of the data and the using of the fourth C-RNTI are as described above processes and their related examples.

In one example, the first DU allocates the fourth C-RNTI in response to the second RA preamble and includes the fourth C-RNTI in the third RAR. In one example, the first DU receives a second RRC complete message for responding to the second RRC response message, from the UE. The first DU transmits a second UL RRC MESSAGE TRANSFER message including the second RRC complete message to the first CU.

In one example, the second RRC message is a RRC Reestablishment Request message. In one example, the second RRC response message is a RRC Reestablishment message, and the second RRC complete message is a RRC Reestablishment Complete message. The UE in the RRC_CONNECTED exchanges the above RRC messages. In one example, the first CU receives a fifth C-RNTI of the UE from the first DU, the second DU, the second CU or a BS (e.g., gNB), before receiving the second RRC message. The first CU may (e.g., determine to) release the fifth C-RNTI in response to the second INITIAL UL RRC MESSAGE TRANSFER, the second RRC message, a transmission of the second DL RRC MESSAGE TRANSFER message, the second RRC response message, the second UL RRC MESSAGE TRANSFER message or the second RRC complete message. That is, the first CU uses the fourth C-RNTI instead of the fifth C-RNTI. In one example, the second RRC message includes an I-RNTI, and does not include any C-RNTI. In one example, the second RRC message includes the fifth C-RNTI, and does not include the I-RNTI. The UE may receive the I-RNTI in a RRC Reconfiguration message from the first CU or from the second CU. The first CU or the second CU may allocate the I-RNTI.

In one example, the second RRC message is a RRC Setup Request message. In one example, the second RRC response message is a RRC Setup message, and the second RRC complete message is a RRC Setup Complete message. The UE transmits the RRC Setup Request message in the RRC_IDLE. The UE enters the RRC_CONNECTED in response to the RRC Setup message. In one example, the second RRC message includes a Non-Access-Stratum (NAS) identity (e.g., 5G System Architecture Evolution (SAE) Temporary Mobile Station Identifier (TMSI) (5G-S-TMSI)), and does not include any RNTI.

It should be noted that although the above examples are illustrated to clarify the related operations of corresponding processes. The examples can be combined and/or modified arbitrarily according to system requirements and/or design considerations. Message names and IE names described above are examples and should not narrow a scope of the invention. Embodiments for a UE can be easily modified from the description above.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. The processes 30-50 may be compiled into the program codes 214.

To sum up, the present invention provides a method and related communication device for handling a RNTI. The UE and the DU know using which RNTI to communicate with each other. Thus, the problem regarding using wrong RNTI (s) is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A Distributed Unit (DU) for handling a Radio Network Temporary Identifier (RNTI), comprising:
at least one storage device; and
at least one processing circuit, coupled to the at least one storage device, wherein the at least one storage device stores instructions, and the at least one processing circuit is configured to execute the instructions of:
receiving a random access (RA) preamble from a communication device;
transmitting a RA response (RAR) including a first cell RNTI (C-RNTI) to the communication device, in response to the RA preamble;
receiving a radio resource control (RRC) Resume Request message from the communication device operating in an RRC_INACTIVE state;
transmitting an INITIAL uplink (UL) RRC MESSAGE TRANSFER message including the RRC Resume Request message to a Centralized Unit (CU), wherein the INITIAL UL RRC MESSAGE TRANSFER message includes the first C-RNTI;
receiving a UE CONTEXT SETUP REQUEST message for responding to the INITIAL UL RRC MESSAGE TRANSFER message for the communication device from the CU;
transmitting a UE CONTEXT SETUP RESPONSE message for responding to the UE CONTEXT SETUP REQUEST message, to the CU;
receiving a downlink (DL) RRC MESSAGE TRANSFER message from the CU, wherein the DL RRC MESSAGE TRANSFER message includes a RRC Resume message for responding to the RRC Resume Request message;
transmitting the RRC Resume message to the communication device, operating in the RRC_INACTIVE state, according to the first C-RNTI; and
communicating data with the communication device according to the first C-RNTI.

2. The DU of claim 1, wherein the UE CONTEXT SETUP REQUEST message includes a second C-RNTI, and a first value of the first C-RNTI and a second value of the second C-RNTI are the same or different.

3. The DU of claim 1, wherein the UE CONTEXT SETUP REQUEST message does not include a second C-RNTI.

4. A first Distributed Unit (DU) for handling a Radio Network Temporary Identifier (RNTI), comprising:
at least one storage device; and
at least one processing circuit, coupled to the at least one storage device, wherein the at least one storage device stores instructions, and the at least one processing circuit is configured to execute the instructions of:
receiving a random access (RA) preamble from a communication device;
transmitting a RA response (RAR) including a first cell RNTI (C-RNTI) to the communication device, in response to the RA preamble;
receiving a radio resource control (RRC) Resume Request message from the communication device operating in an RRC_INACTIVE state;
transmitting an INITIAL uplink (UL) RRC MESSAGE TRANSFER message including the RRC Resume Request message to a first Centralized Unit (CU);
receiving a UE CONTEXT SETUP REQUEST message for responding to the INITIAL UL RRC MESSAGE TRANSFER message for the communication device from the first CU;
transmitting a UE CONTEXT SETUP RESPONSE message for responding to the UE CONTEXT SETUP REQUEST message, to the first CU, wherein the UE CONTEXT SETUP RESPONSE message includes a second C-RNTI;
receiving a downlink (DL) RRC MESSAGE TRANSFER message from the first CU, wherein the DL RRC MESSAGE TRANSFER message includes a RRC Resume message for responding to the RRC Resume Request message and the RRC Resume message includes the second C-RNTI;
transmitting the RRC Resume message to the communication device operating in the RRC_INACTIVE state; and
communicating data with the communication device according to the second C-RNTI.

5. The first DU of claim 4, wherein a first value of the first C-RNTI and a second value of the second C-RNTI are the same or different.

6. The first DU of claim 4, wherein the instructions further comprise:
transmitting the RRC Resume message to the communication device according to the first C-RNTI.

7. The first DU of claim 4, wherein the second C-RNTI is received by the first CU from a second DU, before the RRC Resume Request message is received by the first CU.

8. The first DU of claim 4, wherein the second C-RNTI is received by the first CU from a second CU.

9. A Distributed Unit (DU) for handling a Radio Network Temporary Identifier (RNTI), comprising:
at least one storage device; and
at least one processing circuit, coupled to the at least one storage device, wherein the at least one storage device stores instructions, and the at least one processing circuit is configured to execute the instructions of:
receiving a random access (RA) preamble from a communication device;
transmitting a RA response (RAR) including a first cell RNTI (C-RNTI), to the communication device, in response to the RA preamble;
receiving a radio resource control (RRC) Resume Request message from the communication device operating in an RRC_INACTIVE state;
transmitting an INITIAL uplink (UL) RRC MESSAGE TRANSFER message including the RRC Resume Request message to a Centralized Unit (CU);
receiving a UE CONTEXT SETUP REQUEST message for responding to the INITIAL UL RRC MESSAGE TRANSFER message for the communication device from the CU, wherein the UE CONTEXT SETUP REQUEST message includes a second C-RNTI;
transmitting a UE CONTEXT SETUP RESPONSE message for responding to the UE CONTEXT SETUP REQUEST message, to the CU;
receiving a downlink (DL) RRC MESSAGE TRANSFER message from the CU, wherein the DL RRC MESSAGE TRANSFER message includes a RRC Resume message for responding to the RRC Resume Request message;
transmitting the RRC Resume message to the communication device operating in the RRC_INACTIVE state; and
communicating data with the communication device according to the second C-RNTI.

10. The DU of claim 9, wherein the instructions further comprise:
    transmitting the RRC Resume message to the communication device according to the first C-RNTI.

\* \* \* \* \*